United States Patent [19]
Tsukada

[11] Patent Number: 6,002,121
[45] Date of Patent: Dec. 14, 1999

[54] FOCUS DETECTOR HAVING LIGHT DEFLECTOR NEAR IMAGE FORMING PLANE

[75] Inventor: Shinichi Tsukada, Toride, Japan

[73] Assignee: Nikon Corporation, Tokyo, Japan

[21] Appl. No.: 09/004,313

[22] Filed: Jan. 8, 1998

[30] Foreign Application Priority Data

Jan. 24, 1997 [JP] Japan ................................. 9-010993

[51] Int. Cl.[6] ................................. G01J 1/20; G03B 3/00
[52] U.S. Cl. ................................. 250/201.8; 396/114
[58] Field of Search ........................... 250/201.4, 201.2, 250/201.8; 396/111, 114

[56] References Cited

U.S. PATENT DOCUMENTS

| | | |
|---|---|---|
| 4,659,917 | 4/1987 | Suzuki et al. ................. 250/201.8 |
| 4,992,818 | 2/1991 | Karasaki et al. ............... 250/201.8 |
| 5,212,514 | 5/1993 | Goto ............................. 396/114 |
| 5,678,097 | 10/1997 | Suda ............................ 396/114 |
| 5,839,001 | 11/1998 | Ohtaka et al. ................. 396/114 |

FOREIGN PATENT DOCUMENTS 7-333489  12/1995  Japan .

*Primary Examiner*—Stephone Allen
*Attorney, Agent, or Firm*—Oliff & Berridge, PLC

[57] ABSTRACT

To perform accurate focus detection using a wide range of injected luminous flux from a photographic lens, a deflecting plate, which deflects the injected luminous flux of the photographic optical system in the vertical direction with respect to the direction of a pair of entrance pupils of a focus detecting optical system, is provided at, or near, a predetermined image forming plane of the photographic optical system. By this structure, the entrance pupils of the focus detecting optical system can be spread in a direction vertical to the focus detecting direction, and the focus detecting accuracy can be improved by using a wider range of the injected luminous flux of the focus detecting optical system.

14 Claims, 8 Drawing Sheets

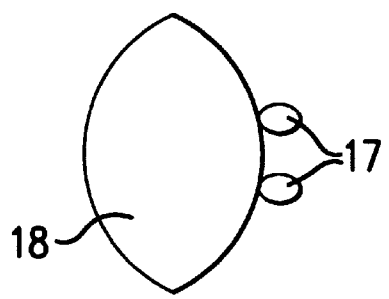
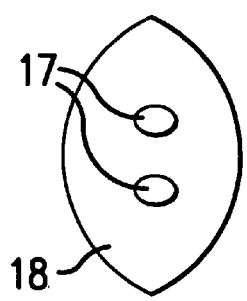
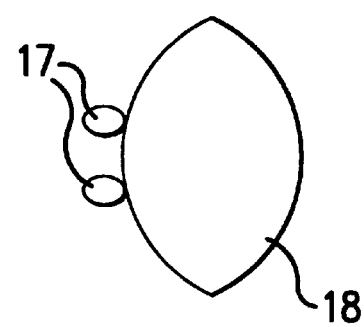
FIG. 12A  FIG. 12B  FIG. 12C
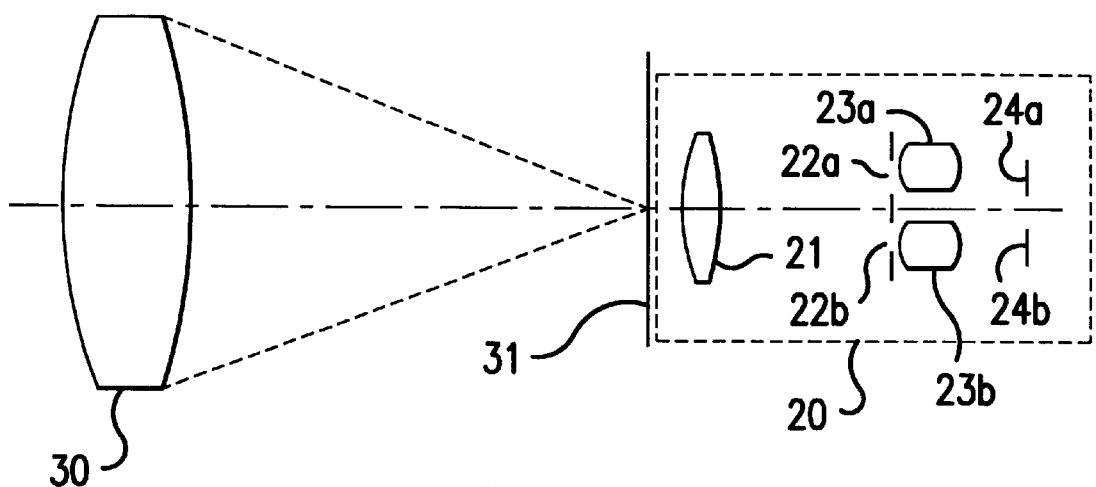
FIG. 13
PRIOR ART

FOCUS DETECTOR HAVING LIGHT DEFLECTOR NEAR IMAGE FORMING PLANE

INCORPORATION BY REFERENCE

The disclosure of the following priority application is herein incorporated by reference: Japanese Patent Application No. 9-010993, filed Jan. 24, 1997 in Japan.

BACKGROUND OF THE INVENTION

1. Field of Invention

The present invention relates to a focus detection device for detecting the focus adjustment condition of a photographic lens. More particularly, the invention relates to a focus detector which accurately performs focus detection using a wide range of injected luminous flux from the photographic lens.

2. Description of Related Art

A prior art focus detector will now be explained using FIGS. 13 and 14. Referring to FIG. 13, a focus detector 20 provides a focus detecting optical system which comprises a condenser lens 21, a pair of diaphragm apertures 22a and 22b, a pair of separator lenses 23a and 23b and a pair of light receiving sensors 24a and 24b. The focus detector 20 is arranged near the predetermined image forming plane 31 of the photographic lens 30. The images transmitted through the condenser lens 21 and the pair of diaphragm apertures 22a and 22b become the entrance pupils 25 (see FIG. 14) of the focus detector 20.

FIG. 14 illustrates the entrance pupils 25 overlapping the injected luminous flux (light) 26 provided to the focus detecting optical system. As can be seen in FIG. 14, the prior art focus detector 20 only uses a small part of the injected luminous flux 26 for focus detection. In other words, the prior art focus detector 20 only detects the focusing position of a small part of the luminous flux within the injected luminous flux 26 of the photographic lens 30.

In general, injected luminous flux from a photographic lens suffers aberrations, such as, for example, a spherical aberration. Thus, one cannot properly select the focusing position of the entire luminous flux from the focusing position of the small part of the luminous flux within the injected luminous flux of the photographic lens. Accordingly, it is desirable to perform focus detection using as much of the luminous flux as possible. In order to do so, it is necessary to enlarge the diaphragm apertures 22a and 22b of the prior art focus detector 20. However, if the diaphragm apertures 22a and 22b are too large, the amount of shift of the images on the pair of light receiving sensors 24a and 24b is too great. Since the predetermined image forming plane 31 and the pair of light receiving sensors 24a and 24b share a common vertical plane, if the focusing of the photographic lens 30 is shifted in relation from the predetermined image forming plane 31, the image on the pair of light receiving sensors 24a and 24b will also shift. Therefore, the smaller the diaphragm apertures 22a and 22b are, the smaller the amount the image will shift, and conversely, the larger the diaphragm apertures 22a and 22b are, the larger the amount the image will shift. It should be noted that when the amount of the image shift is large, the contrast disappears, and the accuracy of the focus detection decreases.

In order to perform accurate focus detection using as wide a range of luminous flux as possible within the injected luminous flux of the photographic lens, a focus detector is known, such as, for example, the focus detector of Japanese Laid-Open Patent Application No. 7-333489, in which a light diffusion member is provided at, or near, a predetermined image forming surface of the photographic lens, and the entrance pupil areas of the focus detecting optical system are substantially made to be large. However, since this prior art focus detector also enlarges the entrance pupil area of the focus detecting optical system in the alignment direction of the pair of the entrance pupils, or in other words, the focus detecting direction, the focusing accuracy is adversely affected.

SUMMARY OF THE INVENTION

In order to overcome the shortcomings in the prior art mentioned above, it is an object of the invention to provide a focus detector which performs accurate focus detection using a wide range of injected luminous flux from the photographic lens.

In particular, according to a first aspect of the invention, a focus detector forms an image using luminous flux passed through the focus detecting optical system of a photographic optical system. In addition, the focus detector is able to detect an amount the image shifts and supplies this shift amount to a focus detecting device that detects a focus adjustment condition of the photographic optical system. The focus detector also provides a deflecting plate that changes the direction of the injected luminous flux in a direction vertical with respect to the focus detecting direction of the entrance pupil areas at, or near, a predetermined image forming plane of the photographic optical system.

According to a second aspect of the invention, the focus detector is capable of deflecting the injected luminous flux to cover the entire condenser lens.

According to a third aspect of the invention, the deflecting plate of the focus detector is capable of varying the degree of deflection and provides a degree of deflection changing means which changes the deflecting degree of the deflecting plate.

According to a fourth aspect of the invention, the focus detector makes the area in which the focus adjusting condition of the photograph optical system is detected to be off-axis with respect to the photographic optical system.

BRIEF DESCRIPTION OF THE DRAWINGS

The invention will be described in conjunction with the following drawings in which like reference numerals designate like elements and wherein:

FIG. 12A illustrates the relationship between the entrance pupil and the injected luminous flux of the photographic lens at the entrance pupil surface of the focus detecting optical system when the deflecting plate is removed from the focus detector illustrated in FIG. 10 according to the fourth embodiment of the invention, with the photographic lens having a short exit pupil distance;

FIG. 12B illustrates the relationship between the entrance pupil and the injected luminous flux of the photographic lens at the entrance pupil surface of the focus detecting optical system when the deflecting plate is removed from the focus detector illustrated in FIG. 10 according to the fourth embodiment of the invention, with the photographic lens having an exit pupil distance of intermediate length;

FIG. 12C illustrates the relationship between the entrance pupil and the injected luminous flux of the photographic lens at the entrance pupil surface of the focus detecting optical system when the deflecting plate is removed from the focus detector illustrated in FIG. 10 according to the fourth embodiment of the invention, with the photographic lens having a short exit pupil distance;

FIG. 13 is a side view of a prior art focus detector; and

DETAILED DESCRIPTION OF PREFERRED EMBODIMENTS

Figure 1A:
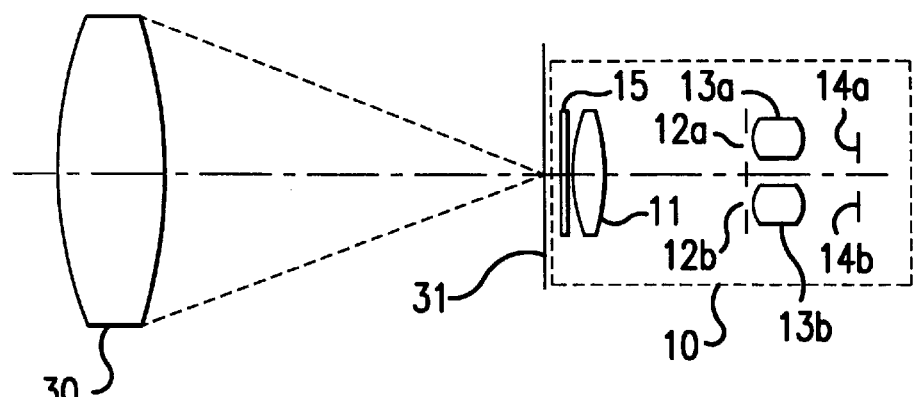
FIG. 1A is a side view of a focus detector according to one embodiment of the invention.

While the invention will hereafter be described in connection with preferred embodiments thereof, it will be understood that it is not intended to limit the invention to those embodiments. On the contrary, it is intended to cover all alternatives, modifications and equivalents that may be included within the spirit and scope of the invention as defined by the appended claims.

Hereafter a detailed description of embodiments of the focus detector of this invention is provided with reference to the drawings. In the drawings, like reference numerals have been used throughout to designate like elements.

FIG. 1A is a side view of the focus detector according to a first embodiment of the invention. The focus detector 10 includes a focus detecting optical system including a deflecting plate 15, a condenser lens 11, a pair of diaphragm apertures 12a and 12b, a pair of separator lenses 13a and 13b and a pair of light receiving sensors 14a and 14b. The deflecting plate 15 is arranged at, or near, a predetermined image forming plane 31 of the photographic lens 30. The deflecting plate 15 diffusely deflects the injected luminous flux of the photographic optical system in the alignment direction of the pair of diaphragm apertures 12a and 12b, which is also the alignment direction of the pair of separator lenses 13a and 13b, and the alignment direction of the pair of light receiving sensors 14a and 14b. In other words, with respect to FIGS. 1A and 1B, deflecting plate 15 diffusely deflects the injected luminous flux in a vertical (up-and-down) direction.

Figure 1B:
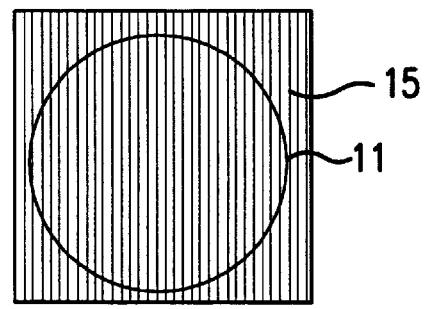
FIG. 1B illustrates the relationship between the deflecting plate and the condenser lens of the focus detector according to the first embodiment of the invention, as viewed from the photographic lens side of a predetermined image forming plate.

FIG. 1B illustrates the relationship of the deflecting plate 15 and the condenser lens 11 as viewed from the photographic lens 30 side of the predetermined image forming plane 31. The deflecting plate 15 is configured to cover the entire condenser lens 11. Alternatively, the deflecting plate 15 does not have to cover the entire condenser lens 11, and may instead be configured to cover only the entrance pupil areas 17, see FIG. 3, of the focus detecting optical system.

Figure 2:
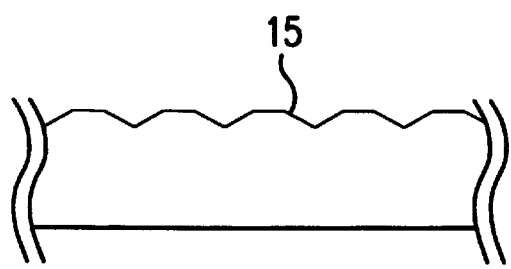
FIG. 2 is an enlarged side view of a portion of the deflecting plate of the focus detector according to the first embodiment of the invention.

FIG. 2 is a side view (from the bottom or top) of the deflecting plate 15. Referring to FIG. 2, it can be seen that the deflecting plate 15 has at least three kinds of deflection faces with different deflecting angles periodically dispersed throughout the deflecting plate 15. In other words, the deflecting plate 15 has at least three different deflection angles that repeat throughout the structure of the deflecting plate 15. If the arrangement period of the deflection angles is too small, the manufacturing of the deflecting plate 15 is difficult. On the other hand, if the arrangement period of the deflection angles is too large, the difference of the deflections become too obvious from the position on the predetermined image forming plane 31. Therefore, an arrangement period of approximately 20~200 $\mu$m between the deflection angles is desirable. Moreover, in this case, the size of discrete areas is determined by the angle of the deflection surface in the slanted plane.

Figure 3:
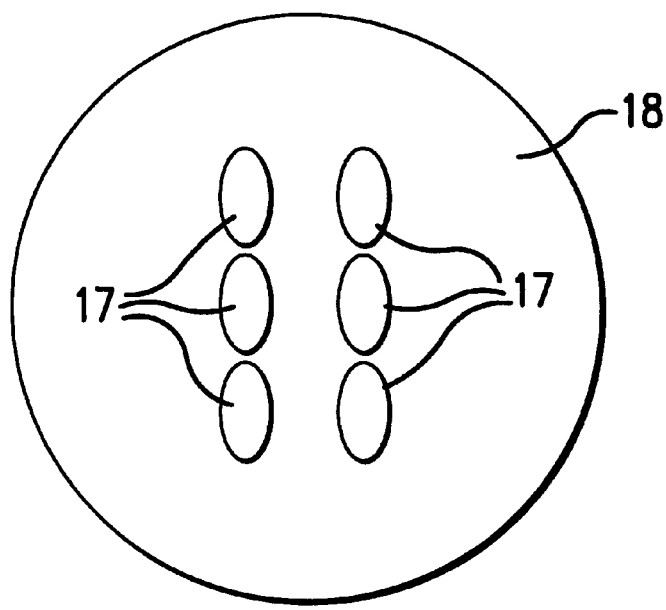
FIG. 3 illustrates the relationship between the entrance pupil and the injected luminous flux of the photographic lens at the entrance pupil plane of the focus detecting optical system of the focus detector according to the first embodiment of the invention.
Figure 14:
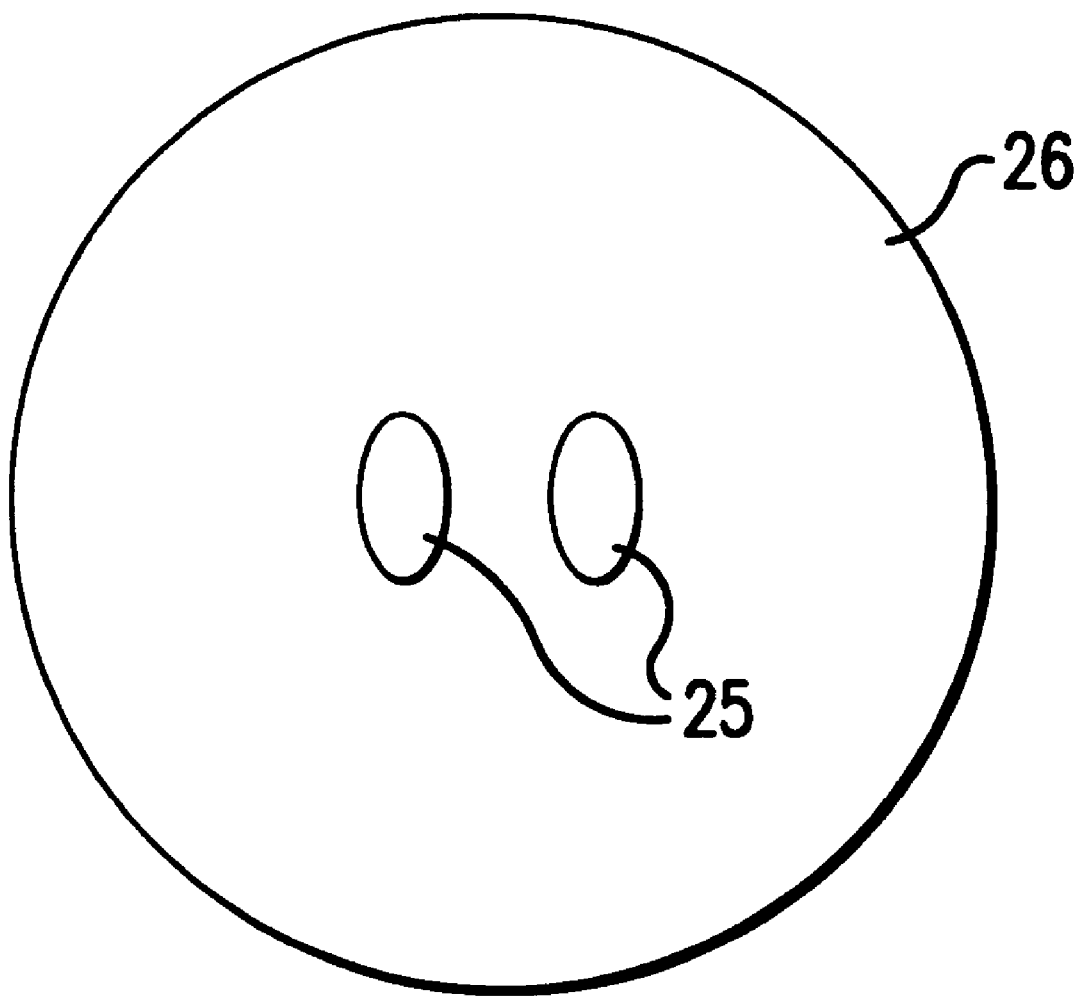
FIG. 14 illustrates the relationship between the entrance pupil and the injected luminous flux of the prior art focus detector.

As previously described, when the deflecting plate 15 does not exist, as depicted in FIGS. 13 and 14, the images transmitted through the condenser lens 21 and the pair of the diaphragm apertures 22a and 22b become the entrance pupils 25 of the focus detecter 20. In contrast, as shown in FIG. 3, the entrance pupils 17 are formed when the deflecting plate 15 of the focus detecter 10 of the invention is used. In particular, since the deflecting plate 15 has a repeating pattern of three surfaces (having different angles of orientation), the number (or overall size) of the entrance pupils triples. That is, three separate images are transmitted through the condenser lens 11, the pair of the diaphragm apertures 12a and 12b and the deflecting plate 15. The entrance pupils 17 thus cover a larger amount of the injected luminous flux 18.

Moreover, not only are the areas of the entrance pupils 17 deflected by the deflecting plate 15, but the entire injected luminous flux 18 is deflected by the deflecting plate 15. Hereafter, for simplicity of description, the description will be given based on the areas of the entrance pupils 17 being deflected by the deflecting plate 15.

FIG. 3 illustrates the relationship between the entrance pupil 17 and injected luminous flux 18 of the photographic lens 30 at the entrance pupil plane of the focus detecting optical system, with the areas of the entrance pupils 17 overlapping the injected luminous flux 18. As mentioned above, the light that forms the entrance pupils is deflected in three directions by the deflecting plate 15 as transmitted from the photographic lens 30. When compared with FIG. 14, which shows the relationship of the entrance pupils 25 and injected luminous flux 26 without the deflecting plate 15, it can be seen that a wider range of luminous flux is incident to the focus detector 10 in the first embodiment of the invention. Therefore, it becomes possible to have high accuracy in focus detection by a wide range of injected luminous flux 18.

Since the deflecting direction of the injected luminous flux 18 onto the areas of the entrance pupils 17 of the focus detecting optical system through the deflecting plate 15 is in a vertical direction with respect to the alignment direction, the deflecting does not have an effect on the focus detecting accuracy.

Now, a second embodiment of the invention, having another deflecting plate 15A will be explained. The configuration of the focus detector 10 is identical to the first embodiment shown in FIG. 1 with the exception of the deflecting plate 15A. Therefore, an explanation of the second embodiment's general structure is omitted.

Figure 4:
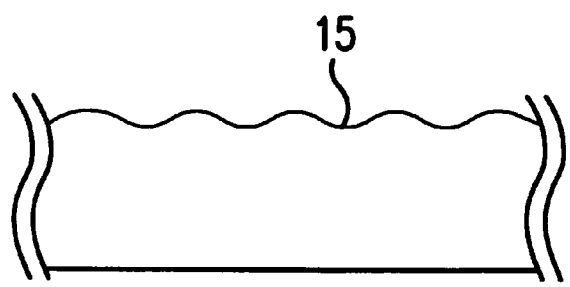
FIG. 4 is an enlarged side view of a portion of the deflecting plate of the focus detector according to a second embodiment of the invention.
Figure 5:
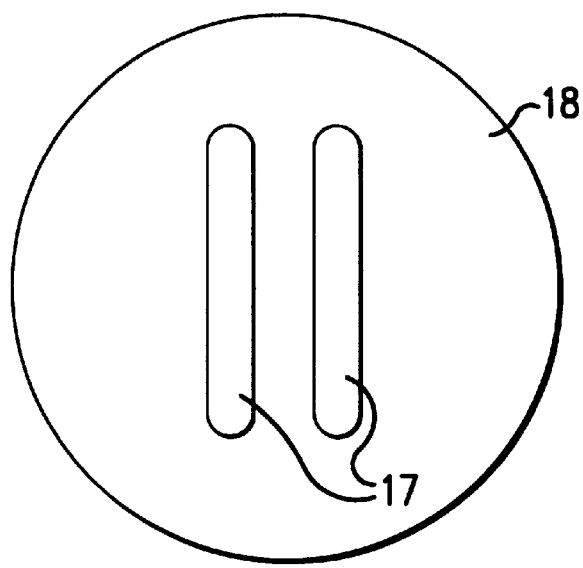
FIG. 5 illustrates the relationship between the entrance pupil and the injected luminous flux of the photographic lens at the entrance pupil plane of the focus detecting optical system of the focus detector according to the second embodiment of the invention.

FIG. 4 is a side view (from the bottom or top) of the deflecting plate 15A, according to the second embodiment of the invention, provided with a deflecting face having a continuous sine wave shape. As shown in FIG. 5, the area of coverage for the entrance pupils 17 of the focus detector 10 is broader due to the sine wave configuration of the deflecting face of the deflecting plate 15A. Furthermore, it is unnecessary to make the configuration of the deflecting face to be an accurate, or exact, sine wave shape. The shape of the deflecting face simply needs to be such that the deflecting angle is continuously changing.

When compared with FIG. 14, which shows the relationship of the entrance pupils 25 and the injected luminous flux 26 without the deflecting plate 15A, it can be seen that a wider range of luminous flux is incident to the focus detector 10 in the second embodiment of the invention. Therefore, it becomes possible to have high accuracy in focus detection by a wide range of injected luminous flux 18.

Moreover, when compared with FIG. 3 of the first embodiment, which discretely covers the areas of the entrance pupils 17 of the focus detecting optical system, the focus detector of the second embodiment can project a range of luminous flux that is wider than the range shown in FIG. 3 by an amount equivalent to the level that the entrance pupil 17 areas are broader. Therefore, the focus detecting accuracy of the focus detector 10 can be further improved.

Figure 6:
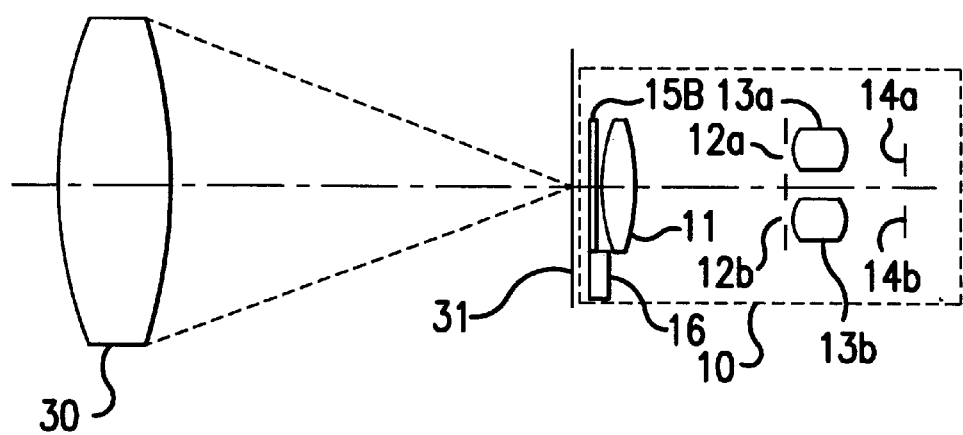
FIG. 6 is a side view of the focus detector according to a third embodiment of the invention.

Now, a third embodiment of the invention, having an actuator 16 and another deflecting plate 15B will be explained. FIG. 6 is a side view of a focus detector 10 according to a third embodiment of the invention. The configuration of the focus detector 10 is identical to the first embodiment shown in FIG. 1, with the exception of the presence of an actuator 16 and the configuration of the deflecting plate 15B.

Figure 7A:
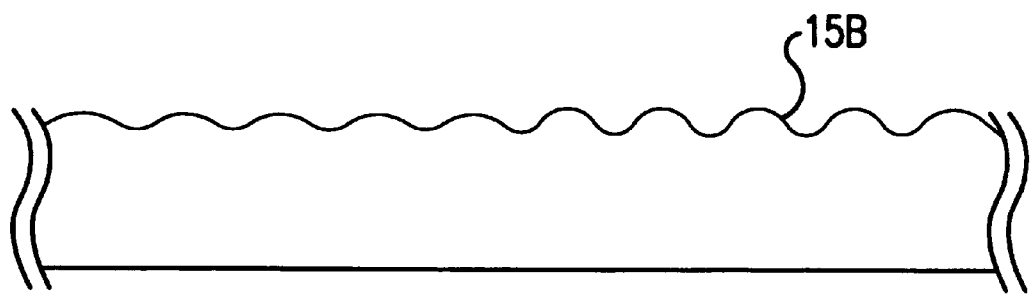
FIG. 7A is an enlarged side view of a portion of the deflecting plate of the focus detector according to the third embodiment of the invention.

The deflecting plate 15B can be moved by the actuator 16. FIG. 7A is a side (from the bottom or top) view of the deflecting plate 15B, according to the third embodiment of the invention. The deflecting surface of the deflecting plate 15B is a sine wave shape. Using the center of the deflecting plate 15B as a boundary (see the broken line in FIG. 7A), it can be seen that the frequency, or sine wave width, of the right side portion is larger than the frequency of the left side portion. In other words, the deflecting degree of the right side portion of the deflecting plate 15B is stronger than that of the left side portion.

In general, a larger F-stop value of a photographic lens, the smaller the pupil magnification will be, resulting in the spread of the injected luminous flux being small. When this is the situation, even if the areas of the entrance pupils of the focus detecting optical system are widened, the entrance pupils will end up outside of the injected luminous flux and will be wasted.

Figure 7B:
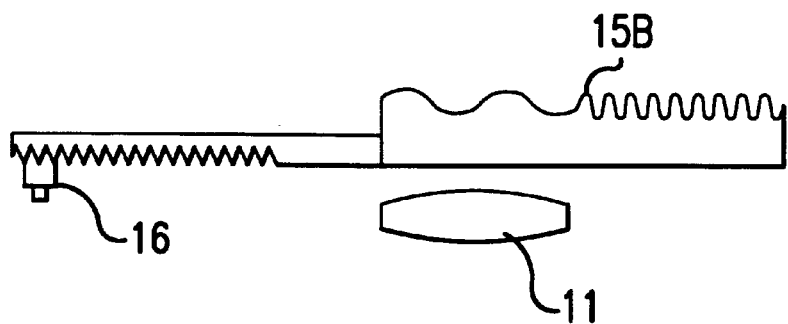
FIG. 7B illustrates the relationship between the deflecting plate equipped with an actuator, and a condenser lens of the focus detector according to the third embodiment of the invention.

FIG. 7B is a top view and shows the relationship between the deflecting plate 15B equipped with the actuator 16 and the condenser lens 11.

When the F-stop value of the photographic lens 30 is small, the left side portion of the deflecting plate 15B, in which the deflecting degree is weak, is used. When the F-stop value is large, the actuator 16 is operated and the right side portion of the deflecting plate 15B, in which the deflecting degree is strong, is used.

Figure 8:
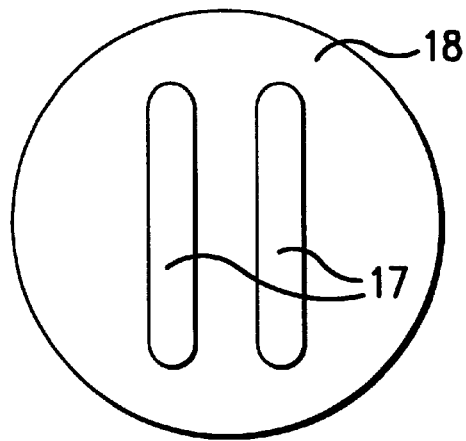
FIG. 8 illustrates the relationship between the entrance pupil of the focus detecting optical system and the injected luminous flux of the photographic lens when a weak deflection degree (amount) of the deflecting plate is used with respect to the photographic lens in which the open value F is large according to the third embodiment of the invention.

FIG. 8 shows the relationship at the entrance pupil plane of the focus detecting optical system of the entrance pupils 17 and the injected luminous flux 18 of the photographic lens 30 when the left side portion of the deflecting plate 15B is used with respect to a photographic lens 30 with a large F-stop value. Since a photographic lens 30 with a large F-stop value has a small injected luminous flux 18, the spread of the entrance pupil 17 areas are decreased by using the left side portion of the deflecting plate 15B with a low deflecting degree.

Figure 9:
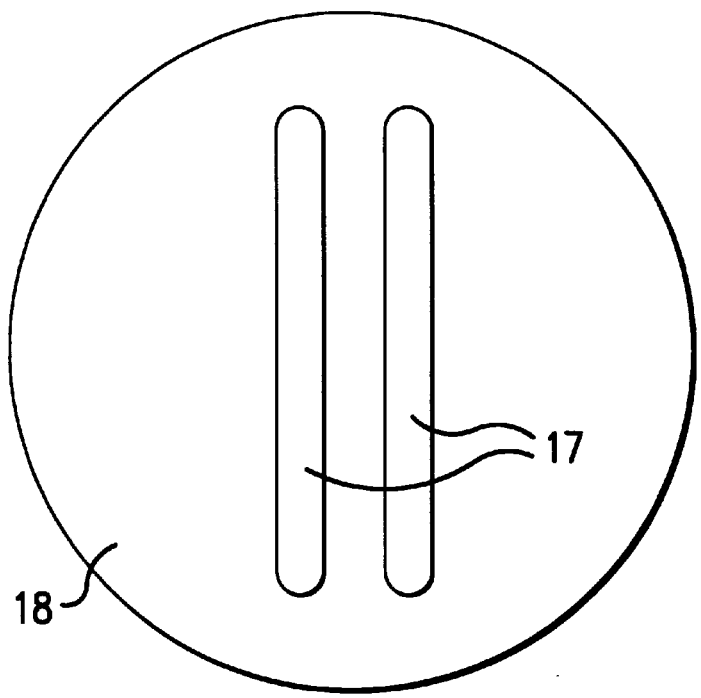
FIG. 9 illustrates the relationship between the entrance pupil and the injected luminous flux of the photographic lens at the entrance pupil plane of the focus detecting optical system of the focus detector when a strong deflection degree (amount) of the deflecting plate is used with the photographic lens in which the opening F value is small according to the third embodiment of the invention.

FIG. 9 shows the relationship at the entrance pupil plane of the focus detecting optical system of the entrance pupils 17 and the injected luminous flux 18 of the photographic lens 30 when the right side portion of the deflecting plate 15B is used with respect to a photographic lens 30 with a small F-stop value. Since a photographic lens 30 with the small F-stop value has a large injected luminous flux 18, the spread of the entrance pupil 17 areas are increased by using the right side portion of the deflecting plate 15B with a high deflecting degree.

Since the deflecting degree of the deflecting plate 15B is thus switched according to the F-stop value of the photographic lens 30, the spread of the entrance pupil can be adjusted according to the spread of the injected luminous flux 18 of the photographic lens 30. Thus, high accuracy in focus detection can be achieved by using a wider range of luminous flux of the entrance pupils with respect to any kind of photographic lens.

Now, a fourth embodiment of the invention will be explained. The focus detector 10 performs focus detection, hereafter called off-axis focus detection, of areas separated from the center of the photographic screen, also referred to as the vicinity of the optical axis of the photographic lens.

Figure 10:
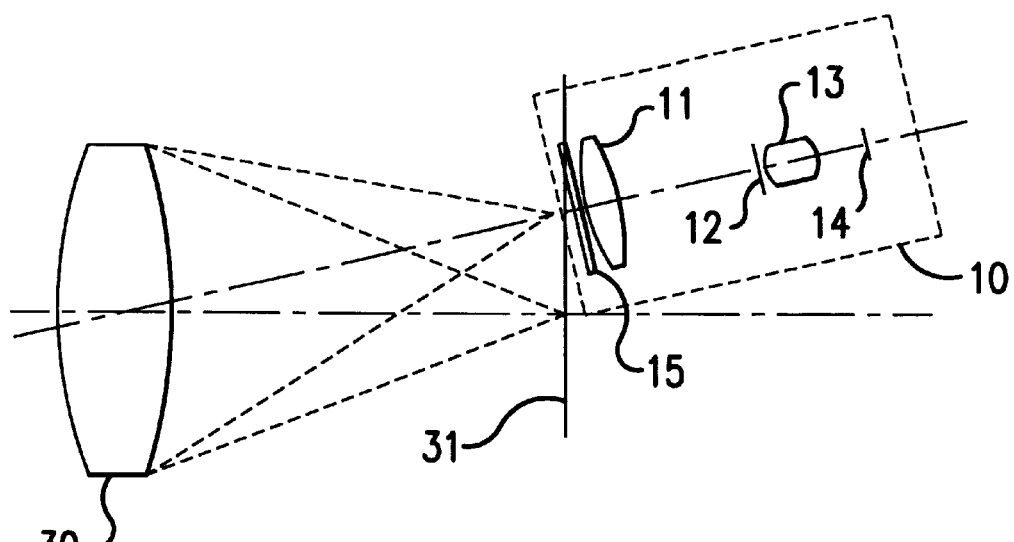
FIG. 10 is a side view of the focus detector according to a fourth embodiment of the invention.

FIG. 10 shows a perspective view of the focus detector 10, according to the fourth embodiment of the invention, with the focus detector 10 shown in FIG. 1 off-axis with respect to the photographic lens 3 to perform off-axis focus detection. In the focus detector 10 of the fourth embodiment, the pair of diaphragm apertures 12a and 12b are overlapped and become a diaphragm aperture 12. The pair of separator lenses 13a and 13b are also overlapped and become a separator lens 13. Moreover, the pair of lightreceiving sensors 14a and 14b are overlapped and become a light receiving sensor 14.

Figures 11A, 11B, 11C:
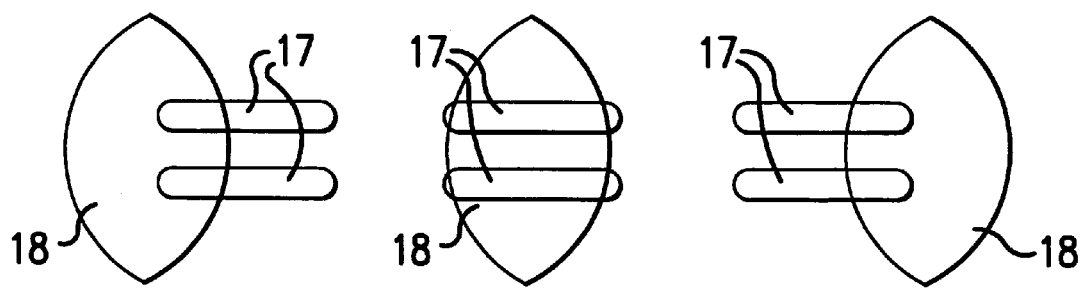
FIG. 11A illustrates the relationship between the entrance pupil and the injected luminous flux of the photographic lens at the entrance pupil surface of the focus detecting optical system of the focus detector according to the fourth embodiment of the invention, with the photographic lens having a short exit pupil distance.
FIG. 11B illustrates the relationship between the entrance pupil and the injected luminous flux of the photographic lens at the entrance pupil surface of the focus detecting optical system of the focus detector according to the fourth embodiment of the invention, with the photographic lens having an exit pupil distance of intermediate length.
FIG. 11C illustrates the relationship between the entrance pupil and the injected luminous flux of the photographic lens at the entrance pupil surface of the focus detecting optical system of the focus detector according to the fourth embodiment of the invention, with the photographic lens having a long exit pupil distance.

FIGS. 11A–11C show the relationship of the entrance pupils 17 and the injected luminous flux 18 of the photographic lens 30 at the entrance pupil surface of the focus detecting optical system of the focus detector 10 of the fourth embodiment. FIG. 11A shows a situation where a photographic lens 30 has a short exit pupil distance. FIG. 11B shows a situation where the photographic lens 30 has an intermediate length exit pupil distance. FIG. 11C shows a situation where the photographic lens 30 has a long exit pupil distance.

FIGS. 12A–12C show the relationship between the entrance pupil 17 and the injected luminous flux 18 of the photographic lens 30 at the entrance pupil plane of the focus detecting optical system of the focus detector when the deflecting plate 15 is removed from the focus detector. This configuration is the same as the prior art focus detector shown in FIG. 13. FIG. 12A shows a situation where a photographic lens 30 has a short exit pupil distance. FIG. 12B shows a situation where the photographic lens 30 has an intermediate length exit pupil distance. FIG. 12C shows a situation where the photographic lens 30 has a long exit pupil distance.

A prior art focus detector which does not use the deflecting plate 15 could not perform the focus detection when the exit pupil distance is short, as shown in FIG. 12A, or when the exit pupil distance is long, as shown in FIG. 12C, since the areas of the entrance pupils 17 of the focus detecting optical system do not fall within the injected luminous flux 18 from the photographic lens 30. However, with the fourth embodiment, as shown in FIGS. 11A–11C, since the areas of the entrance pupils 17 are widened as a result of the deflecting operation of the deflecting plate 15, even when the entire area of the entrance pupils 17 are not in the injected luminous flux 18, a portion of the entrance pupils 17 are always in the injected luminous flux 18, and focus detection is possible.

Generally, when focus detection is performed off-axis, it is preferable to make the entrance pupils 17 of the focus detecting optical system face the exit pupil direction of the photographic lens 30. This is because when the direction of the entrance pupils 17 are greatly shifted from the direction of exit pupil, the entrance pupils 17 fall outside of the injected luminous flux 18, and become incapable of focus detection. In off-axis focus detection, even when the direction of the entrance pupils 17 of the focus detecting optical system and the direction of the exit pupils of the photographic lens 30 are shifted, when the areas of the entrance pupils 17 of the focus detecting optical system are covered using the deflecting plate 15, as described above, the entrance pupils 17 fall within the injected luminous flux 18, and therefore focus detection becomes possible.

Moreover, in the case of a camera in which the photographic lens is interchangeable, since the position of the exit pupil is different for each photographic lens, there are cases, depending on the photographic lens, in which no matter what the direction in which the entrance pupil of the focus detecting optical system is set, it is incapable of performing focus detection. Even in this case, with the present invention it becomes possible for the entrance pupil to fall within the injected luminous flux, and focus detection becomes possible.

As explained above, according to the present invention, since an optical deflecting member, which deflects injected luminous flux of the focus detecting optical system in the vertical direction with respect to the direction of alignment of a pair of entrance pupils of the focus detecting optical system, is provided at, or near, a predetermined image forming plane, the entrance pupils of the focus detecting optical system are spread in a direction vertical to the focus detecting direction. Thus, a wider range of the injected luminous flux of the focus detecting optical system can be used for focus detection. Focus detection accuracy is thereby improved.

Moreover, since the deflecting degree of the optical deflecting member is variable and the deflecting degree of the optical deflecting member is switched according to the F-stop value of the photograph optical system, even when a photograph optical system with a different F-stop value is attached, it is automatically switched to the optimum deflecting degree, and accurate focus detection can be performed by using a wider range of luminous flux from the injected luminous flux of the photographic optical system.

Furthermore, in off-axis focus detection, since the deflecting degree of the deflecting component is variable, even when the direction of the entrance pupil of the focus detecting optical system and the direction of the exit pupil of the photographic lens are shifted, the entrance pupil is made to fall within the injected luminous flux by deflecting the injected luminous flux of the photographic lens using the deflecting plate, and therefore focus detection becomes possible.

While the invention has been described in conjunction with specific embodiments thereof, it is evident that many alternatives, modifications and variations may be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. In a focus detector that detects a focus condition by detecting a shift of a pair of images of a photographic object that are formed by passing light formed at an image forming plane by a photographic optical system from the image forming plane through at least one pair of entrance pupils of a focus detecting optical system and onto a pair of detectors, the focus detector further comprising:
    a light deflector located near the image forming plane to deflect the light in a direction orthogonal to an alignment direction of the at least one pair of entrance pupils.

2. The focus detector of claim 1, wherein the light deflector deflects all of the light that forms the at least one pair of entrance pupils.

3. The focus detector of claim 1, wherein the deflector is movably mounted, and further comprising a deflecting degree changing device coupled to the deflector to move the deflector to change a degree of deflection of the deflector.

4. The focus detector of claim 1, wherein the deflector has at least three deflection faces, each of the at least three deflecting faces having different deflecting angles periodically repeating throughout the deflector.

5. The focus detector of claim 1, wherein the deflector has a deflecting face having a continuous wave configuration such that a deflecting angle of the deflector continuously changes.

6. The focus detector of claim 5, wherein the deflecting face has a first side portion and a second side portion, the first side portion having a first side portion deflection degree and the second side portion having a second side portion deflection degree, said second side portion deflection degree being stronger than the first side portion deflection degree.

7. The focus detector of claim 1, wherein the focus detecting optical system is off-axis with respect to an axis of the photographic optical system.

8. A focus detector comprising:

a condenser lens located near an image forming plane of a photographic lens;

at least one pair of separator lenses;

at least one pair of diaphragm apertures located between the condenser lens and the at least one pair of separator lenses, light that passes from the image forming plane through the condenser lens and through each of the diaphragm apertures forming at least one entrance pupil on a corresponding one of the separator lenses, such that at least one pair of the entrance pupils are formed and aligned in a first direction;

at least one pair of detectors, light that passes through each of the separator lenses forming an image on a corresponding one of the detectors; and a light deflector located near the image forming plane to deflect the light in a direction orthogonal to the first direction.

9. The focus detector of claim 8, wherein the light deflector deflects all of the light that forms the at least one pair of entrance pupils.

10. The focus detector of claim 8, wherein the deflector is movably mounted, and further comprising a deflecting degree changing device coupled to the deflector to move the deflector to change a degree of deflection of the deflector.

11. The focus detector of claim 8, wherein the deflector has at least three deflection faces, each of the at least three deflecting faces having different deflecting angles periodically repeating throughout the deflector.

12. The focus detector of claim 8, wherein the deflector has a deflecting face having a continuous wave configuration such that a deflecting angle of the deflector continuously changes.

13. The focus detector of claim 12, wherein the deflecting face has a first side portion and a second side portion, the first side portion having a first side portion deflection degree and the second side portion having a second side portion deflection degree, said second side portion deflection degree being stronger than the first side portion deflection degree.

14. The focus detector of claim 8, wherein the focus detecting optical system is off-axis with respect to an axis of the photographic optical system.

* * * * *